(12) United States Patent
Janek (10) Patent No.: US 9,074,660 B2
(45) Date of Patent: Jul. 7, 2015

(54) TRANSMISSION

(75) Inventor: Bartolomej Janek, Presov (SK)

(73) Assignee: SPINEA, s.r.o., Presov (SK)

( * ) Notice: Subject to any disclaimer, the term of this patent is extended or adjusted under 35 U.S.C. 154(b) by 300 days.

(21) Appl. No.: 13/517,041

(22) PCT Filed: Dec. 18, 2009

(86) PCT No.: PCT/EP2009/009141
§ 371 (c)(1),
(2), (4) Date: Oct. 10, 2012

(87) PCT Pub. No.: WO2011/072707
PCT Pub. Date: Jun. 23, 2011

(65) Prior Publication Data
US 2013/0023373 A1 Jan. 24, 2013

(51) Int. Cl.
*F16H 1/32* (2006.01)

(52) U.S. Cl.
CPC ............ *F16H 1/32* (2013.01); *F16H 2001/326* (2013.01); *F16H 2001/327* (2013.01); *F16H 2001/325* (2013.01)

(58) Field of Classification Search
CPC ................................. F16H 2001/325–2001/327
USPC .......................... 604/4.01–6.16; 475/162–181
See application file for complete search history.

(56) References Cited

U.S. PATENT DOCUMENTS

| | | | | |
|---|---|---|---|---|
| 4,512,213 A | * | 4/1985 | Newton | 475/179 |
| 5,908,372 A | * | 6/1999 | Janek | 477/162 |
| 5,954,609 A | * | 9/1999 | Fecko | 475/162 |
| 8,403,789 B2 | * | 3/2013 | Janek | 475/116 |
| 8,419,944 B2 | * | 4/2013 | Alkanhal | 210/646 |
| 2010/0084872 A1 | * | 4/2010 | Winiasz | 290/55 |

* cited by examiner

*Primary Examiner* — Tisha Lewis
(74) *Attorney, Agent, or Firm* — John Alumit (57) ABSTRACT

A transmission having a hollow-cylindrical main body having end faces, which has internal toothing and a rotation axis and in which a driven input member and an output member are rotatably mounted, wherein the output member comprises two rotating bodies, which are non-rotatably connected to one another and have a circular cross-section transversely to the rotation axis. The rotating bodies are provided with spacers, a gear wheel and a device for converting planetary movements of the gear wheel into rotational movements of the output member being disposed between the rotating bodies. The device has a ring shape, the two end faces of which have two guides with central axes, one of whose end face extend perpendicularly to an axial plane of the transmission, while the other end face extend parallel to the axial plane, and the ring has continuous, axially oriented openings through which spacers pass without contact.

5 Claims, 8 Drawing Sheets

TRANSMISSION

CROSS-REFERENCE TO RELATED APPLICATION

This application is a national stage application and claims the benefit of the priority filing date in PCT/EP2009/009141 referenced in WIPO Publication WO 2011/072707 A1. The earliest priority date claimed is Dec. 18, 2009.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention relates to a transmission as generically defined by the preamble to claim 1 or by the preamble to claim 2.

Transmissions of the aforementioned type are described for instance in international patent disclosure WO 95/22017. Such a transmission has a hollow-cylindrical main body with end faces that is provided with an internal toothing and has a rotary axis. In the main body, a driven input member and an output member are supported rotatably about the rotary axis. The output member includes two spaced-apart rotary bodies, with a circular cross section transversely to the rotary axis. The rotary axis is perpendicular to the two rotary bodies. The rotary bodies can be or are connected fixedly to one another. At least one gear wheel that meshes with the inner gear wheel, as well as means for converting planetary motions of the gear wheel into rotary motions of the output member (also called "converting means" or "conversion means"), are disposed between the rotary bodies. These converting means or conversion means for converting planetary motions of the gear wheel into rotary motions of the output member have a central opening through which the input member is passed, and four arms facing one another in pairs and uniformly distributed in the form of a cross around the central opening. The input member is supported on both sides in the rotary bodies of the output member, and the output member is in turn supported on both sides in the hollow-cylindrical main body.

Such transmissions have a disadvantage in that the conversion means, which in simplified terms are in the form of a cross, can only be manufactured after major technical effort and expense. Moreover, the force distribution inside the cross is unfavorable during torque transmission to the output member, which occurs simultaneously with the conversion of the planetary motion into rotary motion. This is especially so with regard to the incident forces because this is an "open" system.

According to international patent disclosure WO 2007/135540 A2, transmissions with adjustable torque transmission during operation are known. For that purpose, each of the transmissions has at least one fixed wheel split into two axially spaced parts, around which a belt is laid whose length is greater than the circumference of the wheel. A satellite wheel is disposed between the two parts of the fixed wheel. The satellite wheel has a different diameter from the fixed wheel. One input member and one output member are disposed coaxially to a rotary axis. The input member has at least one portion which has an adjustable eccentricity and on which at least one satellite wheel is disposed. Rotation of the input member causes the satellite wheel to roll on the inside face of the belt. With increasing eccentricity, the friction between the satellite wheel and the belt increases, so that a higher torque is transmitted. The conversion of the planetary motion of the satellite wheel into a rotary motion of the output member happens in various ways, depending on the design of the transmission:

If only one satellite wheel is provided, the output member comprises a rotary body disposed on one side of the satellite wheel. In that case, an annular conversion means can be provided between the satellite wheel and the output member. Both end faces of the ring then each have two guide means with center axes. The center axes of the guide means on one end face extend perpendicular to an axial plane, while the center axes of the guide means on the other end face extend parallel to the axial plane.

If two or more satellite wheels are provided, the output member comprises two rotary bodies, connected to one another by means of spacers and spaced axially apart from one another in the direction of the rotary axis. In that case, the satellite wheels move phase-offset by 180°, and the conversion of the planetary motions into a rotary motion of the output member is effected directly via the spacers. To that end, the spacers are guided through eccentric openings in the satellite wheels. Each of the spacers, in every opening it passes through, has constant linear contact, in every configuration, with the respective satellite wheel.

This last manner of converting planetary motions into rotary motions is generally known, for instance, from patent disclosures U.S. Pat. No. 1,767,866, EP 0 474 897 A1, EP 1 816 374 A1, U.S. Pat. No. 3,129,611, and PL 169808, as well as in transmissions which, as described at the outset, have an output member which comprises two rotary bodies, connected to one another by means of spacers and spaced apart axially from one another in the direction of the rotary axis, and at least one gear wheel, disposed between the rotary bodies, which meshes with an internal toothing and executes planetary motions. It is also known in transmissions that have an output member that comprises only one rotary body with pins disposed eccentrically on it, which pins extend in the axial direction of the rotary axis and protrude into eccentric openings in one or more gear wheels, offset axially from the rotary body, that mesh with an internal toothing and execute planetary motions. Each spacer or pin, in every opening it passes through, always and in every configuration has constant linear contact with the respective gear wheel.

From French patent disclosure FR 797 130 A, a transmission with a variable gear ratio and a transmission with a fixed gear ratio are known. Each of the two transmissions has a housing with a rotary axis, and with an input and output member, both disposed in the housing rotatably about the rotary axis. The input member has an eccentric portion on which a gear wheel is disposed. The gear wheel meshes with an internal toothing disposed in the housing. Rotation of the input member causes the gear wheel to execute a planetary motion. The output member comprises a rotary body disposed on one side of the gear wheel. Conversion means for converting planetary motions into rotary motions of the output member are disposed between the rotary body of the output member and the gear wheel. The conversion means comprise a ring. Each of the two end faces of the ring has two guide means with center axes. The center axes of the guide means of one face end extend perpendicular to an axial plane, while the center axes of the guide means of the other face end extend parallel to the axial plane. A gear ring with an external toothing and an internal toothing is disposed, rotatably supported about the rotary axis in the housing of the transmission that has the variable gear ratio. A worm, which meshes with the external toothing of the gear ring, extends into the housing. The worm can be driven at a variable speed by an electric motor, and the gear ratio between the input member and the output member varies with the speed.

From Japanese patent disclosure JP 1 143 171, transmissions with a variable gear ratio are known. The transmissions have a housing with a rotary axis and an input and output member, both of which are disposed rotatably about the rotary axis in the housing. The input member has at least one eccentric portion, on which at least one gear wheel is disposed. The gear wheel meshes with an internal toothing. The internal toothing is located in a rotatably supported bell disposed in the housing. The bell can be driven at a variable speed. With the speed, the gear ratio also varies. The output member comprise a rotary body disposed on one side of the at least one gear wheel. Both end faces of the ring each have two guide means with center axes. The center axes of the guide means of one face end extend perpendicular to an axial plane, while the center axes of the guide means of the other face end extend parallel to the axial plane. In a transmission with two gear wheels that, upon a 180° rotation of the input member execute phase-offset planetary motions, the gear wheels have eccentric openings. Pins extending in the axial direction of the rotary axis pass through these openings and are disposed eccentrically on the rotary body that is disposed on one side of the gear wheels. In each eccentric opening that it passes through, and in every configuration, each pin always has linear contact with the respective gear wheel.

In the known transmissions, there is a disadvantageous in that their construction allows for only a limited load, because
  they have only one rotary body as an output member, to which a torque is transmitted unilaterally with or without the aid of a conversion means for converting planetary motions of the gear wheel into rotary motions of the output member;
  while they have two rotary bodies connected to one another and are axially spaced apart from one another by spacers, the torque transmission, with simultaneous conversion of the planetary motion of the wheels disposed between the rotary bodies into a rotary motion of the output member, is still effected directly by the wheels via the spacers; or
  the conversion means in the form of a cross are provided between the gear wheel and the output member, and these means form an open system with regard to the forces that occur when a torque is transmitted.

With the above prior art as the point of departure, it is the object of the invention to provide a remedy for these disadvantages.

The stated object is attained by the features of claim 1 and the features of claim 2.

SUMMARY

A transmission having the features of claim 1 includes a hollow-cylindrical main body with end faces that has an internal toothing and a rotary axis, in which main body a driven input member and an output member are rotatably supported. The output member includes two rotary bodies with spacers, the rotary bodies being connectable or connected non-rotatably to one another and having a circular cross section transversely to the rotary axis. Between the rotary bodies, at least one gear wheel and at least one means for converting planetary motions of the gear wheel into rotary motions of the output member are disposed. According to the invention, it is provided that the converting means or conversion means or means for converting planetary motions of the gear wheel into rotary motions of the output member, called simply means for short, has the form of a ring with a central opening. At least two guide means are disposed on each of the two end faces of at least one means. The guide means, each disposed on one end face, are disposed relative to opposite sides of the central opening such that their center axes preferably coincide or preferably form a common center axis. Moreover, the center axes of the guide means on one end face extend perpendicular to an axial plane, while the center axes of the guide means of the other end face extend parallel to that axial plane. In other words, the center axes of the guide means of one end face extend perpendicular to the center axes of the guide means of the other end face. At the same time, the center axes of all the guide means extend perpendicular to the rotary axis, and more precisely perpendicular to planes in each of which the rotary axis is located or which are formed by the rotary axis. That is, an annular plane formed by the ring and located parallel to the end faces extends perpendicular to the rotary axis, and the center axes of the guide means extend parallel to that annular plane. The ring, moreover, has continuous, axially oriented openings, which spacers (preferably spacers connecting the rotary bodies of the output member non-rotatably to one another) pass through without contact.

Accordingly, a transmission having the features of claim 2 includes a hollow-cylindrical main body with end faces having an internal toothing and a rotary axis. In the main body, a driven input member and an output member are rotatably supported. The input member has an eccentric portion, on which a gear wheel is disposed. The gear wheel meshes with the internal toothing. Rotation of the input member causes the gear wheel to execute a planetary motion. The transmission furthermore includes means for converting planetary motions of the gear wheel into rotary motions of the output member. The means are embodied in the form of a ring. Both end faces of the ring each have at least two guide means with center axes. The center axes of the guide means of one end face extend perpendicular to an axial plane, while the center axes of the guide means of the other end face extend parallel to the axial plane. The output member includes two rotary bodies connected non-rotatably to one another. The rotary bodies have a circular cross section transversely to the rotary axis. The rotary bodies are spaced apart from one another in the axial direction of the rotary axis and are connected to one another by spacers. Between the rotary bodies the at least one gear wheel and the at least one means for converting planetary motions of the gear wheel into rotary motions of the output member are disposed. The ring of the means for converting planetary motions of the gear wheel into rotary motions of the output member has continuous, axially oriented openings. Spacers pass through these openings without contacting them.

The invention is realized in cases relating to a transmission in which the means for converting planetary motions of the gear wheel into rotary motions of the output member (converting means or conversion means) is, or are, in the form of a ring; it is therefore a closed system in regards to the incident forces, in which the guide means are positioned on the face ends. The guide means can be embodied in the form of raised areas or recesses, which are operatively connected to corresponding parts of the rotary bodies. Annular means are easier to manufacture than crosses and have greater strength. In addition, because of their more homogeneous tension distribution, annular means have improved force distribution in the material employed. Thus, at the same cost for material, or in other words using the same material and the same weight, they can bear heavier loads than a cross employed in the prior art. Moreover, at the same load-bearing capacity, in comparison to such a cross, they can either be produced from a less-expensive material, which may also be simpler to process and manufacture, or they are lighter.

Further expedient and advantageous embodiments of the invention will become apparent from the dependent claims.

DRAWINGS

One exemplary embodiment of the invention is shown schematically in the drawings and will be described in detail hereinafter. In the drawings.

LIST OF REFERENCE NUMERALS

3 Bearing body
4 Continuous opening at input member
10 Input member
12 Roller element
17 Eccentric portion
30 Gear wheel
30a Axis of the gear wheel
30b Linear guide on the gear wheel
31 Inner running surface
32 Opening
33 External toothing
34a, 34b Guideways of the linear guide on the gear wheel
35a, 35b Rasied areas on the gear wheel
40 Main body
40a Rotary axis
40b Plane
41 Internal toothing on the main body
41a Axial grooves on the inner circumference of the main body
41b Needle-like roller bodies, disposed in the axial slots
42a Running surface
43 Bearing
49 End face
50, 50' Rotary body
50b Linear guide
51, 51' Central opening
52 Spacer
53, 53' Axial recesses in spacers
54a, 54b Guideways
55a, 55b Raised areas
59 Threaded recesses
60 Connecting element
70 Conversion element
71 Central opening in conversion element
74-1 Guide means
74-2 Guide means
74-3 Guide means
74-4 Guide means
74a, 74b Guideways
75a, 75b Guideways
77-X Center axis
77-Y Center axis
78 Axially oriented openings
80, 90 Roller elements
e Eccentricity

DETAILED DESCRIPTION

The transmissions shown in their entirety or in part in FIGS. 1-8 all comprise a hollow-cylindrical main body 40 with face ends 49 which has an internal toothing 41 and a rotary axis 40a and in which a driven input member 10 and an output member are rotatably supported. The output member includes two rotary bodies 50, 50'. The rotary bodies 50, 50' are embodied essentially in disk-like fashion. The disk-like parts of the rotary bodies 50, 50' are spaced apart from one another by spacers 52. The rotary bodies 50, 50' are connectable or connected fixedly to one another. The rotary bodies 50, 50' have a circular cross section transversely to the rotary axis 40a. Two gear wheels 30 are disposed between the rotary bodies 50, 50'. The gear wheels 30, with their external toothing 33, mesh with the internal toothing 41 of the main body 40. Between the rotary bodies 50, 50', there are also means for converting planetary motions of the gear wheels 30 into rotary motions of the output member. The means are embodied in the form of conversion elements 70. In addition, an annular retaining body, not shown, can be connected fixedly to the end face 49. Via roller elements, the rotary body 50 is braced in both the axial and radial directions directly on the main body 40 and on the retaining body that is disposed on the face end 49.

The functional layout of the moving parts disposed between the rotary body 50, 50' in the main body 40 is identical in all the exemplary embodiments shown in the drawings. An input member 10 in the form of an input shaft has two eccentric portions 17, which are offset from one another by 180°. The eccentric portions 17 are offset from the rotary axis 40a by an eccentricity e. One gear wheel 30 is rotatably supported on each of the eccentric portions 17. The eccentricity e is thus equivalent to the spacing between the axis 30a of a gear wheel 30 and the rotary axis 40a of the main body 40. To reduce friction losses, roller elements 12 that each roll on the outer circumference of the eccentric portions 17 are disposed between the eccentric portions 17 and the gear wheels 30. To that end, tracks for the roller elements 12 are embodied on the circumference of the eccentric portions 17 and act as bearing bodies for the gear wheels 30. The gear wheels 30 each have an external toothing 33 and central openings with inner running surfaces 31 for the roller bodies 12.

The gear wheels 30 each have a plurality of continuous axial openings 32, offset radially from the central opening that has an inner running surface 31, which are all distributed uniformly about the axes 30a of the gear wheels 30. The axes 30a of the gear wheels 30 extend parallel to the rotary axis 40a of the input member 10 and of an output member formed by two rotary bodies 50, 50'. The rotary axis 40a is, at the same time, the axis of symmetry of the main body 40. The input member 10 can be connected, for instance by means of a spring, to a motor shaft of a drive motor. The drive motor can be connected, for instance, by means of a cap (not shown) and screws, to the main body 40 that has the internal toothing 41 and is embodied as an internal geared wheel. The drive motor can be disposed, for instance, on the side of the transmission facing away from the rotary body 50 supported in the main body 40. That side then forms the driving end of the transmission, while conversely the rotary body 50 supported in the main body 40 forms the driven end of the transmission.

The gear wheels 30 are disposed in the middle between the two rotary bodies 50, 50' embodied with a circular outer contour or circular cross section transverse to the rotary axis 40a, and these rotary bodies are disconnectably connected to one another by connecting elements 60 and jointly form the output member of the transmission. The spacers 52, which have openings and threaded recesses for receiving the connecting elements 60, are disposed on the rotary body 50. The spacers 52 pass without contact through the openings 32 in the gear wheels 30, so that the rotary bodies 50, 50' can be connected fixedly to one another all the way through the gear wheels 30. The output member formed by the two rotary bodies 50, 50' that are connected to one another is supported rotatably about the rotary axis 40a relative to the main body 40 having the internal toothing 41.

The internal toothing 41 of the main body 40 meshes with the external toothing of the gear wheels 30. The axes of the gear wheels 30 are disposed parallel to the rotary axis 40a of the main body 40, but offset by the eccentricity e. The rotary bodies 50, 50' are provided with guideways 54a, 54b, which define a linear guide 50b. The linear guide 50b is oriented transversely to the rotary axis 40a of the rotary bodies 50, 50'. Each gear wheel 30 is provided with guideways 34a, 34b, which define a linear guide 30b, and this linear guide 30b is oriented transversely to the axis 30a of the gear wheel 30. On both sides of the transmission, a conversion element 70 embodied as a ring is disposed between the respective rotary body 50 and 50' and the gear wheel 30. In two directions orthogonal to one another, the conversion element 70 has guide faces 74-1, 74-2 and 74-3, 74-4, respectively, which correspond to the linear guides 50b and 30b of the respective rotary body 50, 50' and gear wheel 30 in such a way that relative to the respective rotary body 50, 50' on the one hand and the respective gear wheel 30 on the other, the conversion element 70 is disposed displaceably in two directions that are orthogonal to one another. One linear guide 50b is embodied on the rotary body 50 or 50', while the conversion element is disposed displaceably in the other direction in the linear guide 30b on the gear wheel 30.

The two rotary bodies 50, 50' and the conversion elements 70 have central openings 51, 51' and 71, respectively. The input member 10 is supported on both of its ends in the central openings 51, 51' of the rotary bodies 50, 50'. The central openings 50, 51' form tracks on their inner faces for bearing bodies 3. By means of the bearing bodies 3, the ends of the input member 10 are supported in the central openings 51, 51' of the rotary bodies 50, 50'. The input member 10 passes without contact through the central opening 71 of the conversion element 70. The inside diameter of the central opening 71 is greater, by at least 2e, than the outside diameter of the portion of the input member 10 that passes through the central opening 71. The guideways 54a and 54b, with which each rotary body 50, 50' is provided, are embodied on the sides facing one another of the raised areas 55a and 55b. The raised areas 55a and 55b are embodied as axially symmetrical pairs and are disposed on the end face of the respective rotary body 50, 50'. The guideways 54a and 54b are embodied directly on the raised areas 55a and 55b of the rotary bodies 50, 50', for instance in the form of milled recesses disposed between the raised areas 55a and 55b. They can also be embodied as flat strips, which can be secured to the opposed sides of the raised areas 55a, 55b.

The guideways 34a, 34b with which each gear wheel 30 is provided are embodied on the sides facing one another of the raised areas 35b. They are formed by pairs facing one another in the center, which are embodied on the end face of the gear wheel 30. The axial openings 32 of the gear wheel 30 are disposed on an arc and are distributed uniformly between the raised areas 35a, 35b. The guideways 34a, 34b are embodied directly on the raised areas 35a, 35b of the gear wheel 30. However, they can also be embodied as flat strips, which are fixedly embodied on the sides facing one another of the raised areas 35a, 35b.

Figure 6:
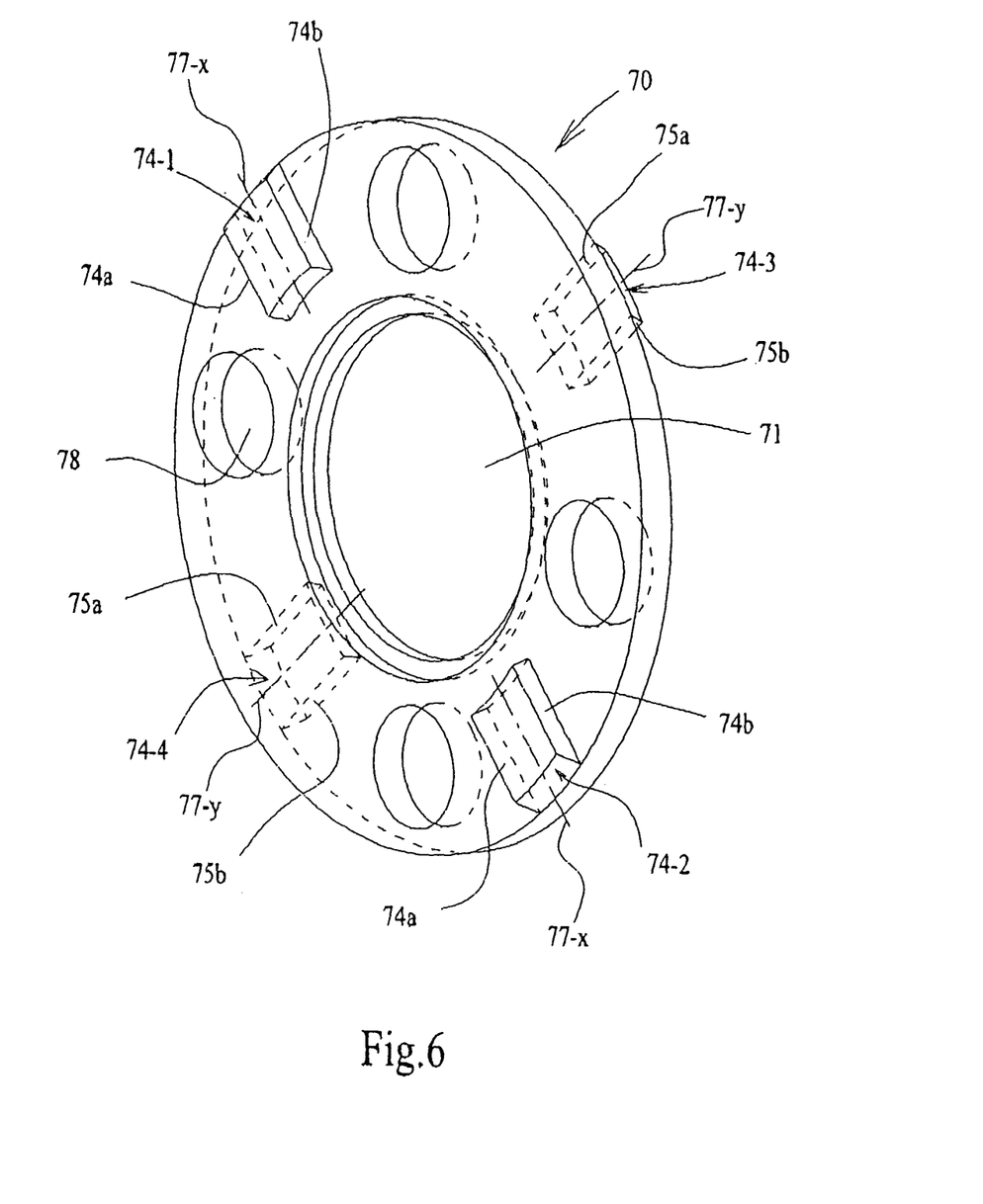
FIG. 6 shows a means in perspective.
Figure 7:
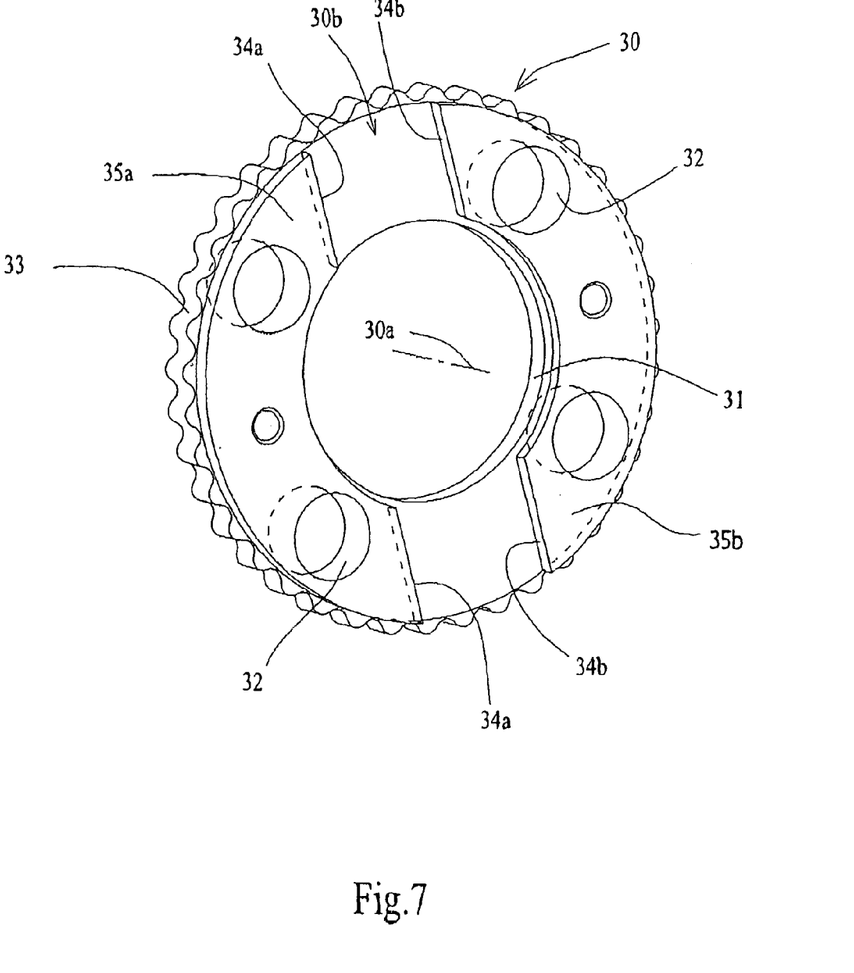
FIG. 7 shows a gear wheel in perspective.
Figure 8:
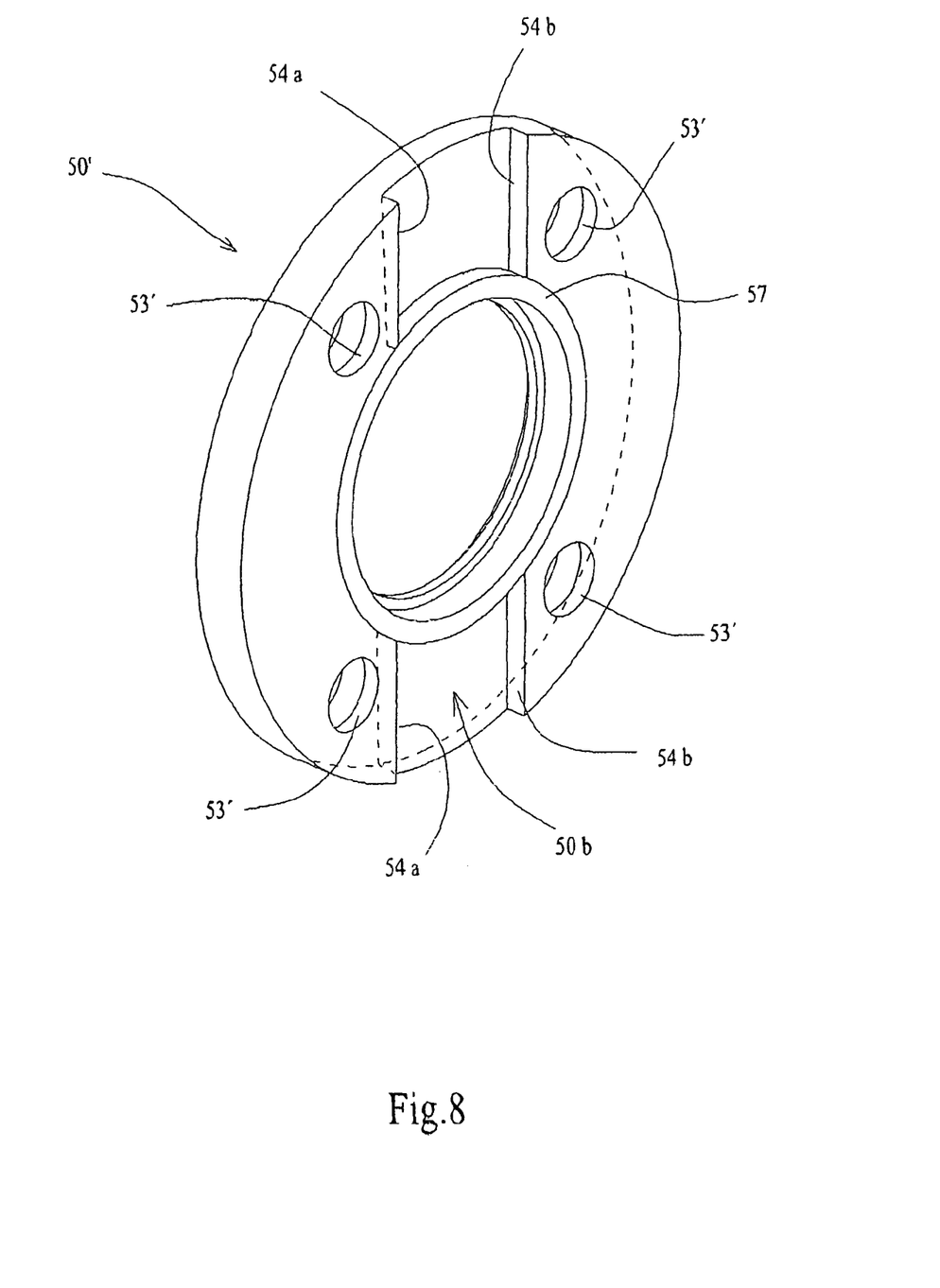
FIG. 8 shows the second rotary body in perspective.

A conversion element 70 includes a ring, or essentially comprises a ring, both end faces of which each have two guide means 74-1, 74-2; 74-3, 74-4 with center axes 77-X, 77-Y. The center axes 77-X of the guide means 74-1, 74-2 extend perpendicular to an axial plane 40ab, while the center axes 77-Y of the guide means 74-3, 74-4 on the other end face extend parallel to the axial plane 40ab. In other words, the center axes 77-X of the guide means 74-1, 74-2 of one end face extend perpendicular to the center axes 77-Y of the guide means 74-3, 74-4 of the other end face. At the same time, the center axes 77-X, 77-Y of all the guide means 74-1, 74-2, 74-3, 74-4 extend perpendicular to the rotary axis 40a, and more precisely perpendicular to planes in which the rotary axis 40a is located or which are formed by the rotary axis 40a. That is, an annular plane formed by the ring and located parallel to the end faces extends perpendicular to the rotary axis 40a, and the center axes 77-X, 77-Y of the guide means 74-1, 74-2, 74-3, 74-4 extend parallel to this annular plane. The center axes 77-X and 77-Y of the guide means 74-1, 74-2 and 74-3, 74-4, respectively, on a given side coincide and are oriented radially, but they could also be disposed spaced apart from one another, in which case they would not be oriented radially. The ring or conversion element 70 furthermore has continuous, axially oriented openings 78, which the spacers 52 of the rotary body 50 pass through without contact. By means of the spacers 52, the two rotary bodies 50, 50' forming the output member are connected non-rotatably to one another.

The guide means 74-1, 74-2, 74-3, 74-4 have guideways 74a, 74b; 75a, 75b, which in a cross section viewed perpendicular to the rotary axis are preferably trapezoidal. However, they could also be embodied as convex or concave.

Cylindrical roller elements 80 are disposed between the guideways 54a and 54b of the linear guide 50b of the rotary body 40 and the guideways 75a, 75b of the conversion element 70, by which guideways the conversion element 70 is disposed displaceably in the linear guide 50b. Cylindrical roller elements 90 are also disposed between the guideways 34a and 34b of the linear guide 30b on the gear wheel 30 and the guideways 74a, 74b of the conversion element 70, by which guideways the conversion element 70 is disposed displaceably in the linear guide 30b. In both cases, guidance of the conversion element 70 by means of roller elements 80, 90 is ensured if the conversion element exerts its oscillatory motions, which convert the planetary motions of the gear wheels 30 into rotary motions of the output member, relative to the gear wheel 30 and relative to the rotary body 50 and the rotary axis 40a. To limit the guideways 74a, 74b, 75a, 75b, boundary faces which limit the motion of the roller elements 80, 90 can be embodied on the guide means 74-1, 74-2, 74-3, 74-4 of the conversion element 70.

The internal toothing 41 of the main body 40 comprises needle-like roller bodies 41b, which are supported in axial slots 41a on the inner circumference of the main body 40. The axial slots 41a are distributed uniformly on the inner circumference of the main body 40. Accordingly, they are gear wheels whose teeth comprise preferably horizontal cylinders. The external toothing 33 of the gear wheel 30 is correspondingly embodied in undulating form.

The spacers 52 are disposed on the raised areas 55a and 55b of the rotary body 50. These spacers 52 pass through the axial openings 30 of the gear wheel 30 with play and are provided with axial recesses 53 and threaded recesses 59. The axial recesses 53 and the threaded recesses 59 are provided for receiving the connecting elements 60. The connecting elements 60 may be embodied as pins or as screws 60, for example. As a result of tightening of the connecting elements 60 embodied as screws 60, the end faces of the spacers 52 define the position of the two rotary bodies 50, 50'.

In contrast to the rotary body 50, the rotary body 50' has no spacers 52. Instead, the rotary body 50' has axial recesses 53' for the spacers 52.

Figure 1:
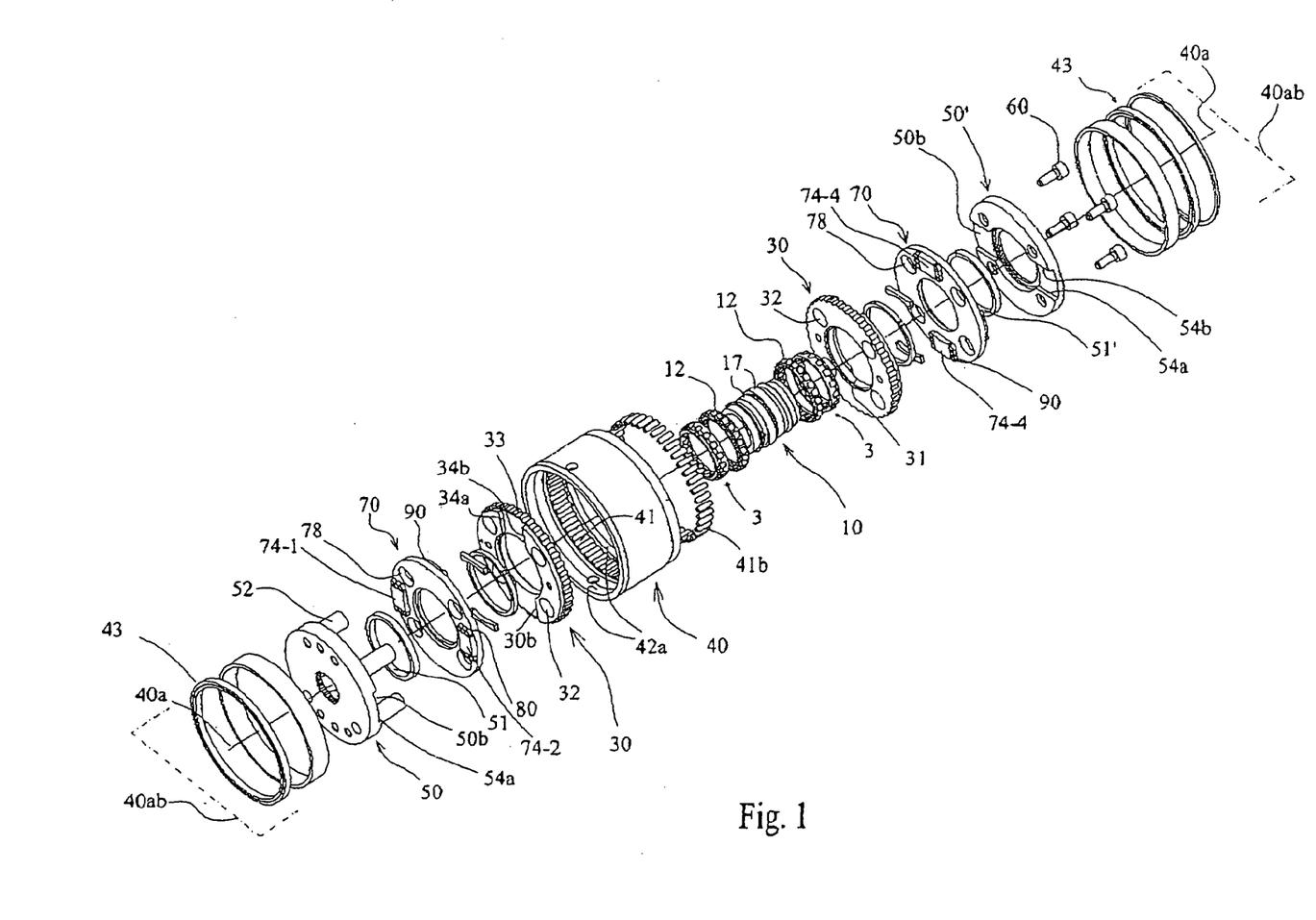
FIG. 1 shows a transmission in an exploded view.
Figure 2:
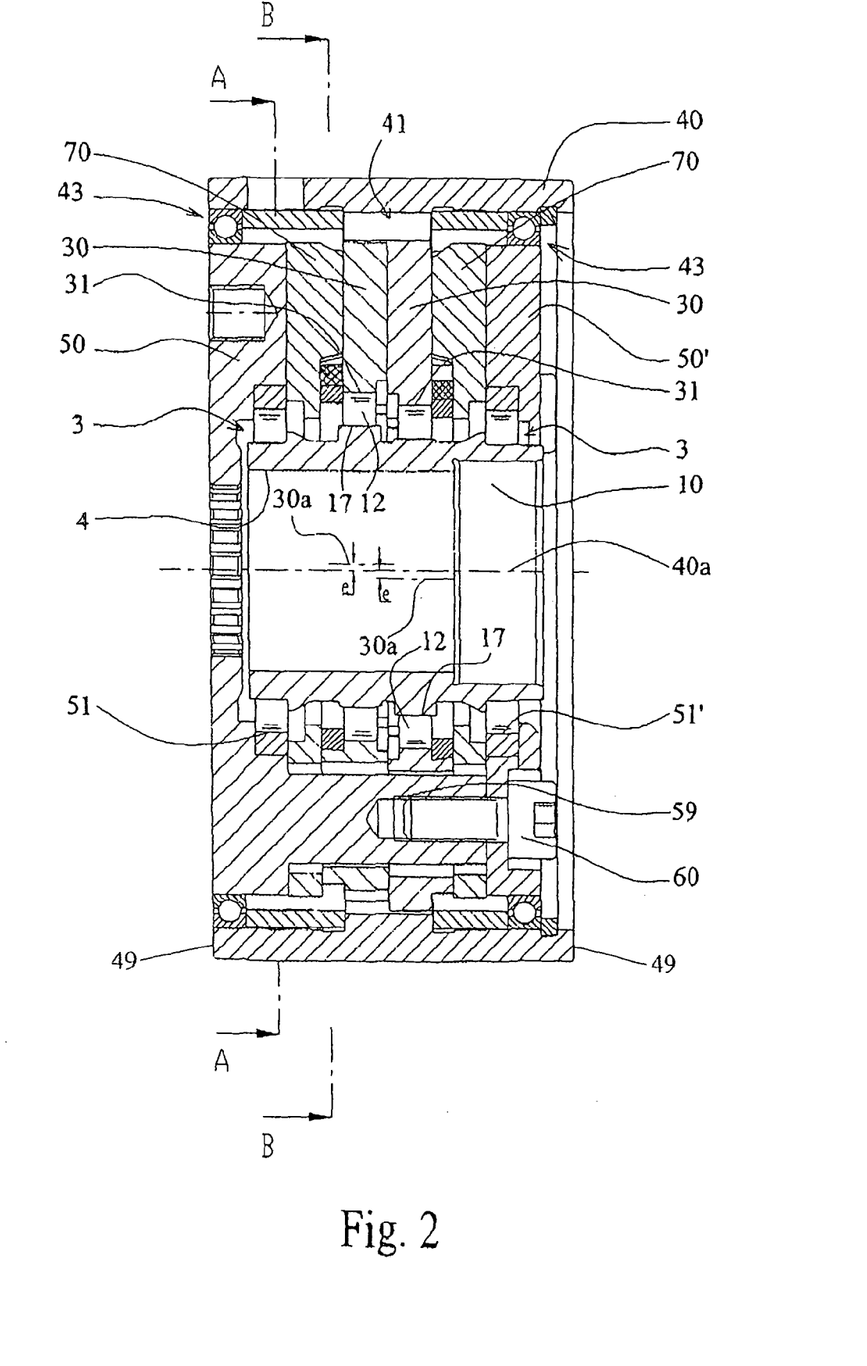
FIG. 2 shows the transmission of FIG. 1 in the assembled state.
Figure 3:
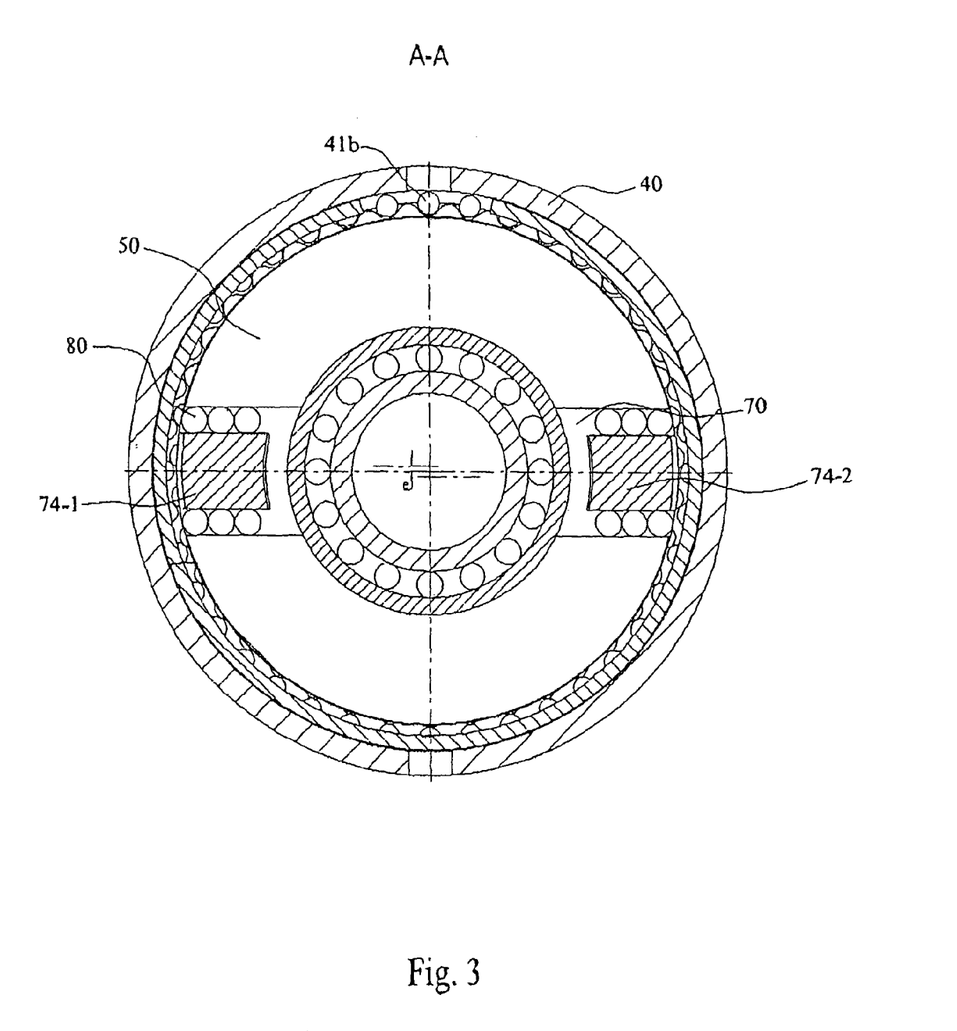
FIG. 3 is a section taken along the line A-A in FIG. 2.
Figure 4:
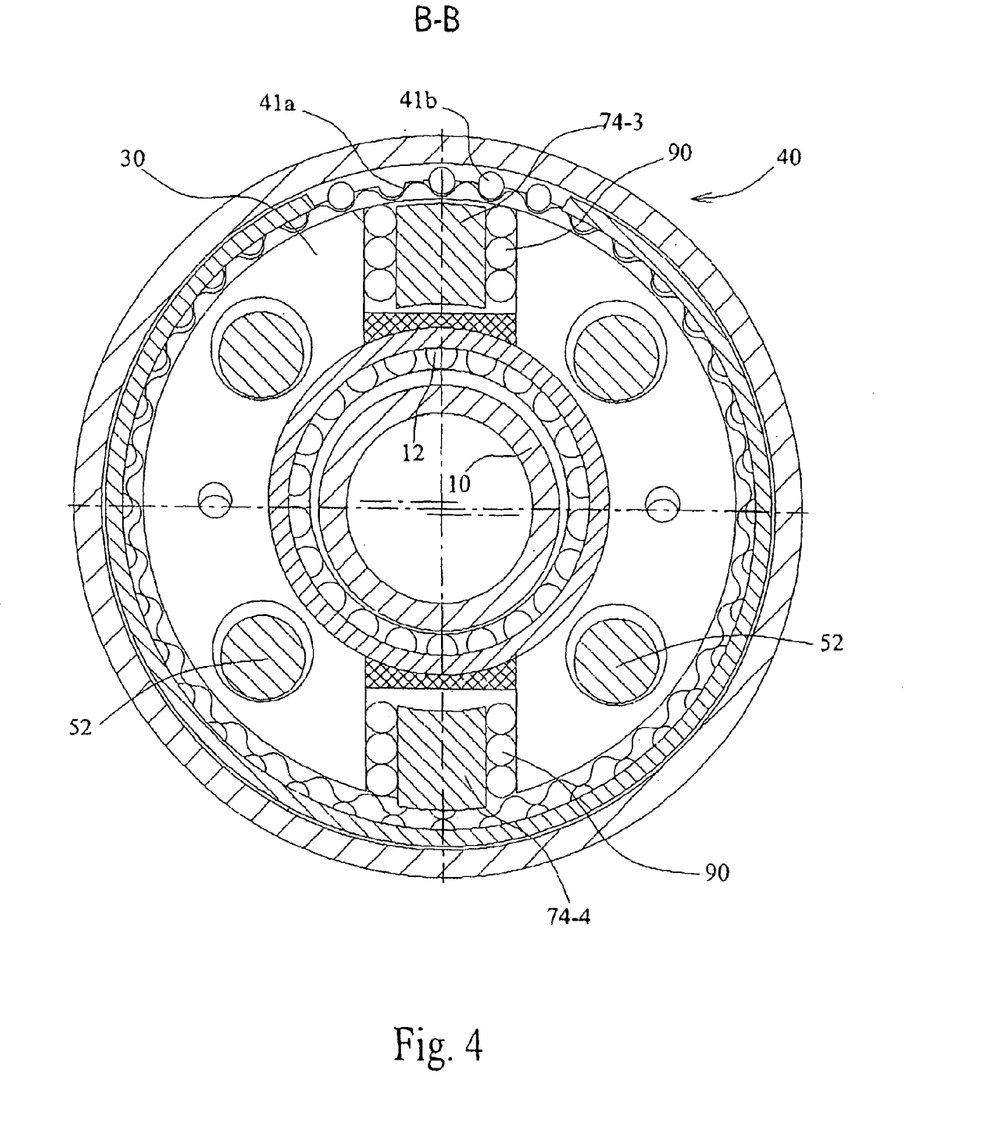
FIG. 4 is a section taken along the line B-B in FIG. 2.
Figure 5:
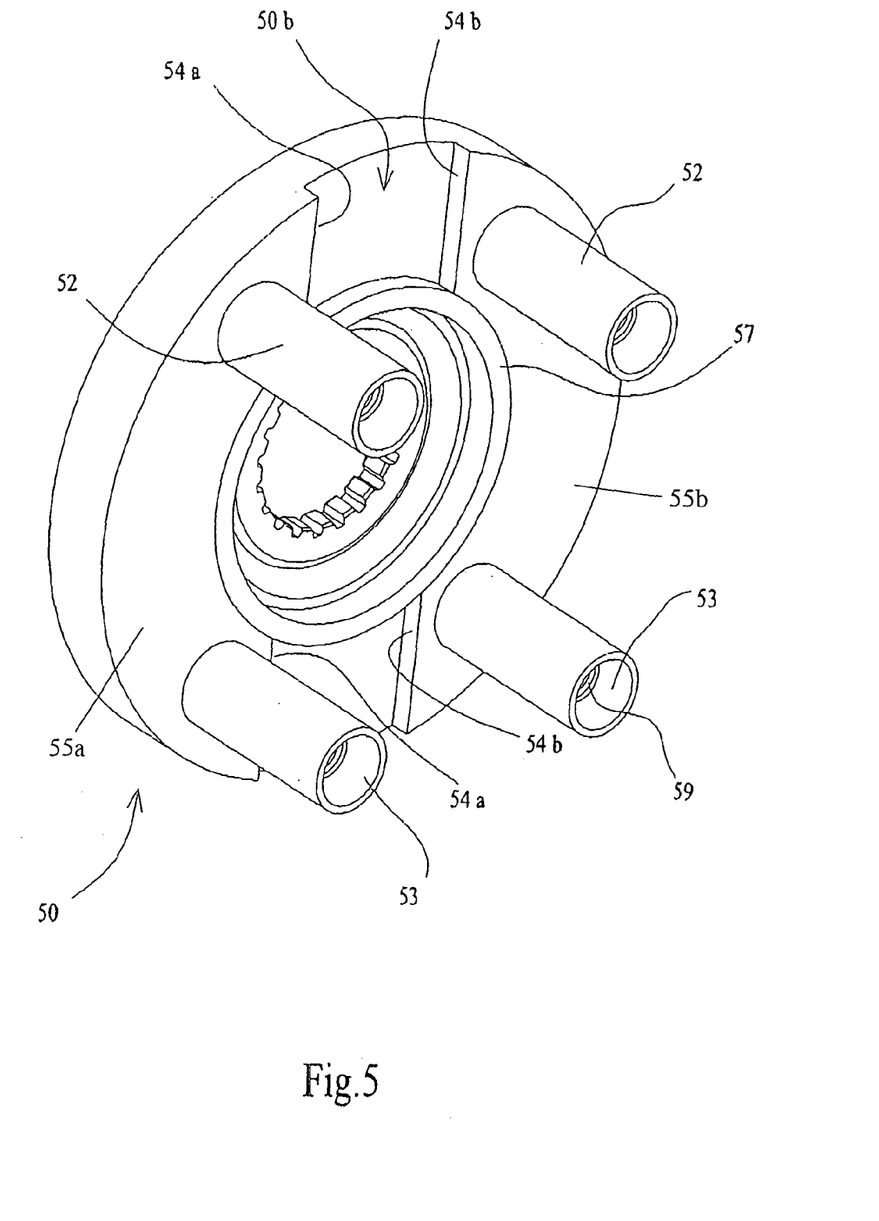
FIG. 5 shows the first rotary body in perspective.

The roller bearing between the main body 40 and the output member formed by the rotary bodies 50, 50' can be formed by cylindrical roller elements, which roll on running surfaces 42a embodied on the main body 40 and the rotary body 50 and extending in a closed path around the rotary axis 40a (FIG. 1). Alternatively, a bearing 43 can also be disposed between the main body 40 and each of the rotary bodies 50, 51' (FIG. 2).

To reduce weight, the input member 10 has a continuous opening 4 extending coaxially to the rotary axis 40a. This opening 4 can at the same time serve to receive, and/or connect with, a drive shaft of a drive motor.

Between the rotary body 50 and a retaining body not shown in detail, a seal extending all the way around may be provided, which prevents contaminants from penetrating the transmission on the driven end.

It is important to emphasize that in the transmission of the invention, the input member, the output member or the main body can arbitrarily be, in principle, the driving end, the driven end, or a fixed element, without impairing the fundamental function of the transmission. Only the gear ratio is changed as a result. In the transmissions in the exemplary embodiments shown, in each case, the input member 10 is provided for being driven by a drive motor. The driven end is then formed, for instance, by the side of the main body 40 on which the rotary body 50 is supported.

The invention can be employed commercially, particularly in the field of manufacturing planetary or cycloid gears, for instance, for used in industrial robots, for electric parking brakes in motor vehicles, or quite generally, for applications which demand a lightweight transmission in as compact a space as possible, and with a high gear ratio and powerful performance data.

What is claimed is:

1. A transmission, having a hollow-cylindrical main body (40) with end faces (49) which has an internal toothing (41) and a rotary axis (40a) and in which the main body, a driven input member (10), and an output member, are rotatably supported, and the output member includes two rotary bodies (50, 50') with spacers (52), the rotary bodies being connected non-rotatably to one another and having a circular cross section transversely to the rotary axis (40a), between which rotary bodies, at least one gear wheel (30) and at least one means (70) for converting planetary motions of the gear wheel into rotary motions of the output member are disposed, wherein, the means (70) is in the form of a ring, both end faces of which have at least two guide means (74-1,74-2; 74-3, 74-4) with center axes (77-X, 77-Y);

the center axes (77-X) of the guide means (74-1,74-2) of one end face extend perpendicular to an axial plane (40ab) of the transmission, while the center axes (77-Y) of the guide means (74-3, 74-4) of the other end face extend parallel to the axial plane (40ab) of the transmission; and the ring has continuous, axially oriented openings (78), through which spacers (52) pass without contacting them.

2. A transmission, having a hollow-cylindrical main body (40) with end faces (49) which has an internal toothing (41) and a rotary axis (40a) and in which the main body, a driven input member (10), and an output member, are rotatably supported, and having a gear wheel (30) and at least one means (70) for converting planetary motions of the gear wheel into rotary motions of the output member in the form of a ring, both end faces of which have at least two guide means (74-1, 74-2; 74-3, 74-4) with center axes (77-X, 77-Y), and the center axes (77-X) of the guide means (74-1, 74-2) of one end face extend perpendicular to an axial plane (40ab) of the transmission, while the center axes (77 of the guide means (74-3, 74-4) of the other end face extend parallel to the axial plane (40ab) of the transmission, wherein the output member includes two rotary bodies (50, 50') with spacers (52), the rotary bodies being connected non-rotatably to one another and having a circular cross section transversely to the rotary axis (40a), between which rotary bodies the at least one gear wheel (30) and the at least one means (70) for converting planetary motions of the gear wheel into rotary motions of the output member are disposed; and the ring has continuous, axially oriented openings (78), through which spacers (52) pass without contacting them.

3. The transmission as recited in claim 1, wherein the guide means (74) have at least one guideway (74a, 74b; 75a, 75b).

4. The transmission as recited in claim 3, wherein the guideways (74a, 74b; 75a, 75b) are embodied trapezoidally or in convex or concave form in a cross section viewed perpendicular to the rotary axis (40a).

5. The transmission as recited in claim 1, wherein the center axes (77-X, 77-Y) of the guide means (74-1,74-2; 74-3, 74-4) are disposed parallel to one another on the respective end face or intersect one another.

* * * * *